(12) United States Patent
Ke et al.

(10) Patent No.: US 11,366,596 B2
(45) Date of Patent: Jun. 21, 2022

(54) DATA STORAGE DEVICE AND DATA ACCESS METHOD FOR QUICKLY LOADING BOOT DATA

(71) Applicant: Silicon Motion, Inc., Jhubei (TW)

(72) Inventors: Kuan-Yu Ke, Zhubei (TW); Shen-Ting Chiu, Houlong Township, Miaoli County (TW)

(73) Assignee: SILICON MOTION, INC., Jhubei (TW)

(*) Notice: Subject to any disclaimer, the term of this patent is extended or adjusted under 35 U.S.C. 154(b) by 0 days.

(21) Appl. No.: 16/406,165

(22) Filed: May 8, 2019

(65) Prior Publication Data

US 2020/0167078 A1 May 28, 2020

(30) Foreign Application Priority Data

Nov. 22, 2018 (TW) ................. 107141711

(51) Int. Cl.
*G06F 3/06* (2006.01)
*G06F 12/02* (2006.01)
*G06F 11/14* (2006.01)
*G06F 9/50* (2006.01)

(52) U.S. Cl.
CPC ............ *G06F 3/064* (2013.01); *G06F 3/0644* (2013.01); *G06F 3/0679* (2013.01); *G06F 9/5077* (2013.01); *G06F 11/1471* (2013.01); *G06F 12/0246* (2013.01)

(58) Field of Classification Search
CPC ...... G06F 3/064; G06F 3/0644; G06F 3/0679; G06F 3/0619; G06F 3/0659; G06F 11/1417; G06F 11/1471; G06F 12/0246; G06F 2201/82; G06F 2201/805
See application file for complete search history.

(56) References Cited

U.S. PATENT DOCUMENTS

| | | | |
|---|---|---|---|
| 2002/0004878 A1* | 1/2002 | Norman | G06F 3/0679 711/103 |
| 2010/0070688 A1 | 3/2010 | Lin | |
| 2012/0246394 A1* | 9/2012 | Ou | G06F 12/0246 711/103 |
| 2013/0145076 A1 | 6/2013 | Chiueh et al. | |
| 2016/0378337 A1* | 12/2016 | Horspool | G06F 3/064 711/103 |
| 2018/0081796 A1 | 3/2018 | Chiu | |
| 2019/0079830 A1* | 3/2019 | Kim | G06F 3/0679 |

(Continued)

FOREIGN PATENT DOCUMENTS

| | | |
|---|---|---|
| TW | 201324154 A1 | 6/2013 |
| TW | 201342068 A | 10/2013 |
| TW | 201814488 A | 4/2018 |

*Primary Examiner* — Tracy A Warren
(74) *Attorney, Agent, or Firm* — McClure, Qualey & Rodack, LLP

(57) ABSTRACT

A data storage device utilized for accessing boot data includes a flash memory, a controller and a RAM. The flash memory includes several blocks, and each block includes several pages. The controller is coupled to the flash memory and the RAM. The controller receives a write command from a host and determines whether the data of the write command is system data or normal data. If the data to be written is system data, the controller transmits a confirm message to the host after the system data has been completely stored on the data storage device.

20 Claims, 7 Drawing Sheets

(56) References Cited

U.S. PATENT DOCUMENTS

2019/0102291 A1* 4/2019 Zhou ................... G06F 3/0659
2019/0129641 A1* 5/2019 Tanpairoj ............. G06F 3/0659
2019/0188082 A1* 6/2019 Lee .................... G06F 3/0614
2020/0104067 A1* 4/2020 Shaharabany ...... G06F 12/0246

* cited by examiner

DATA STORAGE DEVICE AND DATA ACCESS METHOD FOR QUICKLY LOADING BOOT DATA

CROSS REFERENCE TO RELATED APPLICATIONS

This Application claims priority of Taiwan Patent Application No. 107141711 filed on Nov. 22, 2018, the entirety of which is incorporated by reference herein.

BACKGROUND OF THE INVENTION

Field of the Invention

The disclosure generally relates to a data storage device and a data access method and, more particularly, to a data storage device and a data access method which can accelerate the boot speed of an electronic device.

Description of the Related Art

Flash memory is a general-purpose non-volatile data storage device, which is utilized for erasing and programming data electrically. For example, NAND flash may be utilized in a memory card, a USB flash device, SSD, eMMC or UFS.

When an electronic device is used by a user, an accidental or abnormal power-off event might occur during the process of writing data. Accordingly, the boot data might not be loaded within a limited period of time to execute the initialization operation by the electronic device.

BRIEF SUMMARY OF THE INVENTION

In order to solve the aforementioned problem, the invention proposes a data storage device and a data access method, so that the host can quickly load the boot data within a limited period of time to accelerate the booting speed of the electronic device.

In one aspect of the invention, the present invention provides a data storage device which includes a flash memory, a controller, and a random access memory (RAM). The flash memory includes a plurality of blocks. Each of the blocks includes a plurality of pages. The controller is coupled to the RAM and the flash memory. The controller receives a write command from the host and determines whether data to be written by the write command is system data or normal data. When the data to be written by the write command is system data, the controller transmits a confirm message to the host after the system data has been completely stored in the data storage device. The flash memory includes a plurality of logical partitions, the controller receives a setting command from the host and sets up the logical partitions to be a system partition or a data partition respectively based on the setting command. The controller determines whether the data to be written by the write command is system data or normal data according to the logical partition which is assigned by the write command, the data to be written is determined to be system data when the logical partition assigned by the write command corresponds to the system partition, and the data to be written is determined to be normal data when the logical partition assigned by the write command corresponds to the data partition.

In another aspect of the invention, the present invention provides a data access method, applied to a data storage device which comprises a flash memory and a controller. The data storage method includes receiving a write command from the host; determining whether data to be written by the write command is system data or normal data; and when the data to be written by the write command is system data, transmitting a confirm message to the host after the system data has been completely stored in the data storage device. The controller writes the data to be written by the write command to a current block of the blocks and maintains a first mapping table in the RAM, the first mapping table is configured to record the mapping relationship between a physical address and a logical address of each page of the current block. When the data to be written by the write command is system data, the controller writes the system data to the current block and updates a second mapping table of the flash memory according to the first mapping table in the RAM, the controller transmits a confirm message to the host after updating the second mapping table, the second mapping table is configured to record the mapping relationship between each logical address and each physical address of the flash memory.

In some embodiments, the controller receives a setting command from the host and sets up the logical partitions to be a system partition or a data partition respectively based on the setting command. The controller determines whether the data to be written by the write command is system data or normal data according to the logical partition which is assigned by the write command, the data to be written is determined to be system data when the logical partition assigned by the write command corresponds to the system partition, and the data to be written is determined to be normal data when the logical partition assigned by the write command corresponds to the data partition. When the controller receives a read command during a sudden power-off recovery (SPOR) operation and the read command is configured to read the system data, the controller reads and transmits the system data to the host according to the second mapping table without waiting for the SPOR operation. When the controller re-establishes the first mapping table during the SPOR operation, the controller inspects whether or not data of a page in the current block is system data, and when the data of the page is system data, the controller determines whether the mapping relationship of the first mapping table for the page has been updated to the second mapping table or not before an abnormal power-off. If so, the system data of the page is reserved, and if not, the system data of the page is abandoned.

In other embodiments, when the data to be written by the write command is system data, the controller writes the system data to the current block, stores the first mapping table in the RAM to the flash memory, and transmits a confirm message to the host after storing the first mapping table. When the controller receives a read command from the host during a SPOR operation and the read command is configured to read the system data, the controller reads the first mapping table from the flash memory without waiting for the SPOR operation, and the controller reads and transmits the system data to the host based on the first mapping table. When the first mapping table is re-established during the SPOR operation, the controller inspects whether data of a page of the current block is system data or not, and when the data of the page is system data, the controller abandons the system data of the page.

Other aspects and features of the present invention will become apparent to those with ordinarily skill in the art upon review of the following descriptions of specific embodiments of the data storage method and the data storage device.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
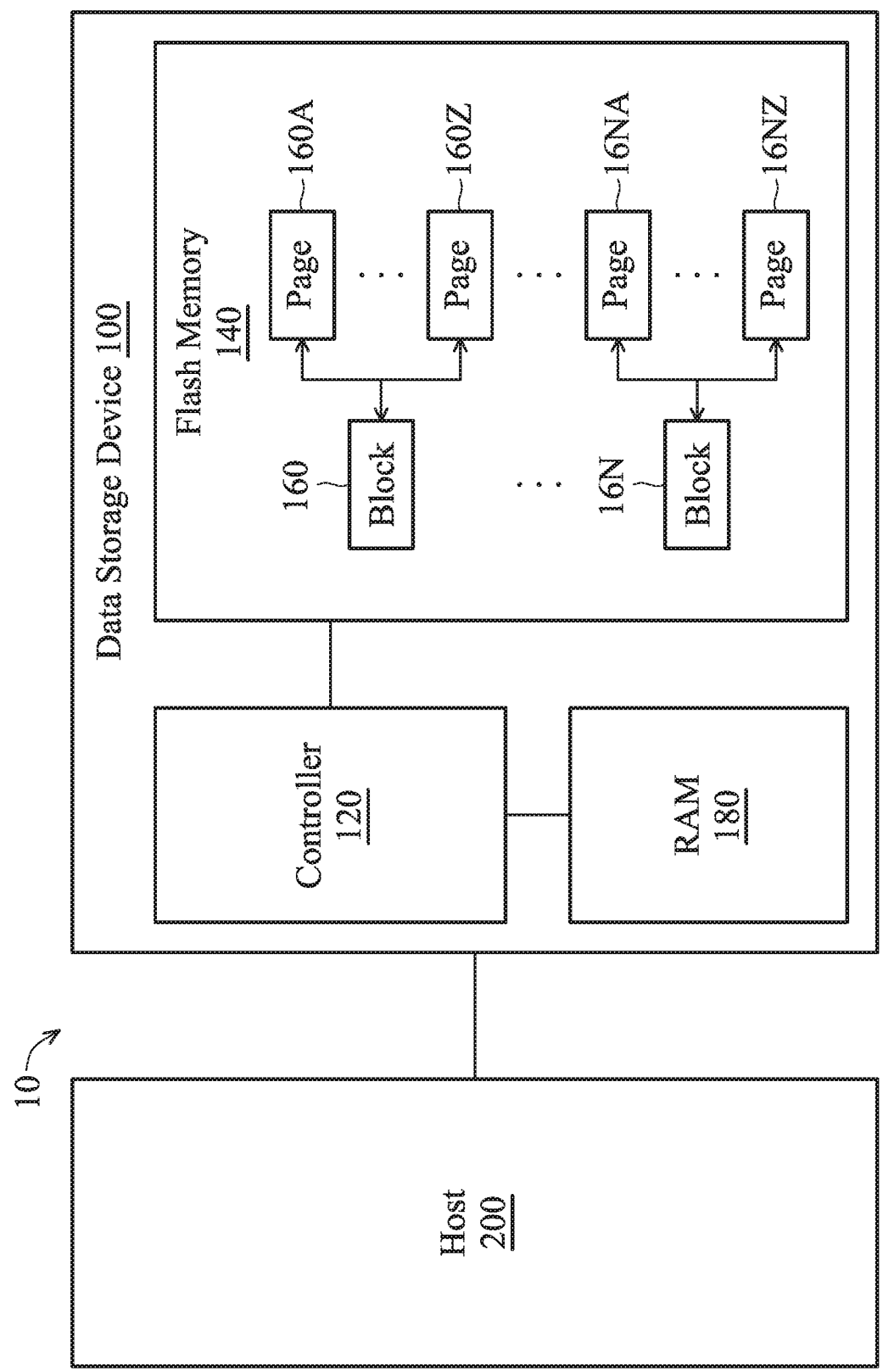
FIG. 1 is a schematic diagram of an electronic device according to an embodiment of the invention.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of an electronic device 10 according to an embodiment of the invention. The electronic device 10 includes the data storage device 100 and the host 200. The electronic device 10 could be mobile electronic devices such as cell phones, tablet computers, laptop computers, gaming apparatuses, electronic books or PDAs, or could be electronic devices such as desktop calculators, servers, ticket machines, digital picture frames, terminals at sale place or digital maps, or could be any electronic devices equipped with touch connection modules (such as touch IC). The host 200 is coupled to the data storage device 100 to access the data of the data storage device 100. The host 200 could include a microcontroller (MCU), a central-processing unit (CPU) or a plurality of parallel processors relating the parallel processing environment to implement the operating system (OS), firmware, driver and/or other applications of the electronic device.

In the embodiment, the data storage device 100 could include a controller 120, a flash memory 140 and a random access memory (RAM) 180. The data storage device 100 is coupled to the host 200 to read or store data according to the commands of the host 200. The data storage device 100 could be solid state disk (SSD) or an embedded storage device which complies with the universal flash storage (UFS) or embedded multi-media card (EMMC). As shown in FIG. 1, the controller 120 is coupled to the flash memory 140 and the RAM 180. The controller 120 could include a micro controller and a read-only memory (ROM) with firmware code. The micro controller could execute the firmware code to access the flash memory 140. The RAM 180 could be static RAM (SRAM). The RAM 180 is utilized to temporarily store the data which will be read or stored by the host 200 and temporarily store the data which is necessary for executing the access operation by the controller 120.

The flash memory 140 could be NAND flash. The flash memory 140 includes several blocks 160~16N, and N is a positive integer. Specifically, each of the blocks 160~16N includes several physical pages. For example, the block 160 includes the physical pages 160A~160Z, and the block 16N includes the physical pages 16NA~16NZ. "A" and "Z" are positive integers, and "Z" is greater than "A". When the controller 120 executes the writing (programming) operation for the flash memory 140, the writing operation is performed by the unit of the physical page of the flash memory 140.

Each of the physical pages 160A~16NZ of the flash memory 140 has a physical address, and each physical address of the physical pages 160A~16NZ is different. However, the data storage device 100 is accessed by the host 200 through the logical address. For example, when the host 200 writes data to the data storage device 100, the controller 120 selects one block among the blocks 160~16N of the flash memory 140 to be the current block for writing data, and maintains the mapping table F2H of the current block in the RAM 180. The mapping table F2H is utilized to record the mapping relationship between the physical address and the logical address of each page of the current block. When the controller 120 writes data to the last page of the current block, the controller 120 stores the mapping table F2H of the RAM 180 in the flash memory 140, and updates the mapping table F2H of the flash memory 140 based on the mapping table F2H. The mapping table H2F is utilized to record the mapping relationship between the physical address and the logical address of the flash memory 140. When the host 200 is prepared to read the data of the data storage device 100, the controller 120 obtains the physical address of the data to be read by the host 200 through the mapping table F2H and/or the mapping table H2F, and reads the data to the host 200. Specifically, when the host 200 is prepared to read the data of the data storage device 100, the controller 120 inquires the mapping table F2H of the RAM 180 to confirm whether or not the data to be read by the host is at the current block. When the data to be read by the host 200 is not at the mapping table F2H (such as the data of the logical address which is assigned by the read command), the controller 120 will be able to inquire the mapping table H2F to obtain the physical address corresponding to the logical address assigned by the read command and read the data of the physical address to the host 200.

Figure 2:
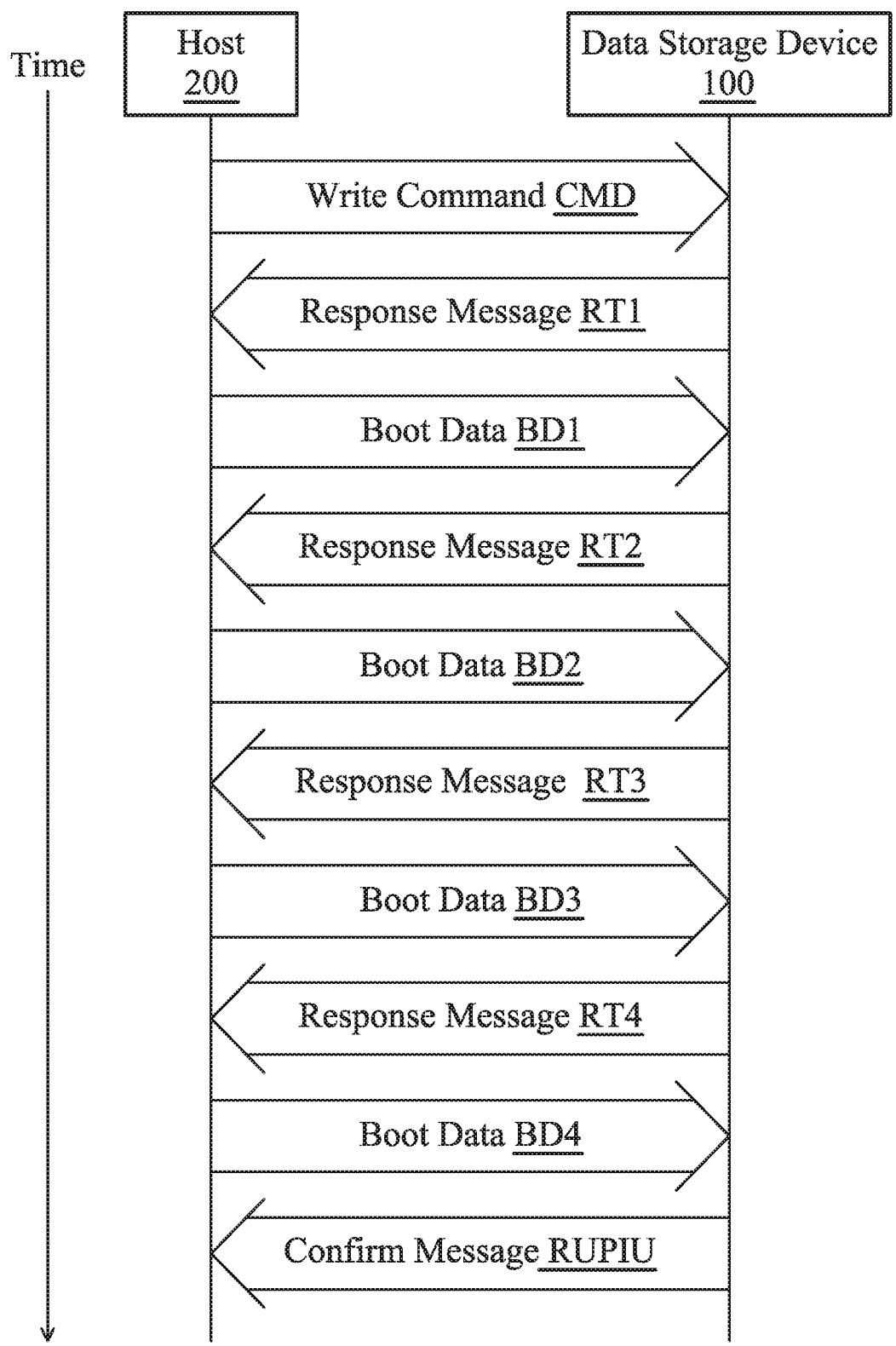
FIG. 2 is a schematic diagram illustrating the transmittance of boot data according to an embodiment of the invention.

FIG. 2 is a schematic diagram illustrating the transmittance of boot data according to an embodiment of the invention. In the embodiment, the host 200 transmits a write command CMD for writing several boot data BD1~BD4 to the data storage device 100. The boot data BD1~BD4 is a system file so that the initialization operation could be performed for booting by the host 200. The write command CMD could be the command UFS protocol information unit (CMD UPIU). As shown in FIG. 2, the host 200 transmits the write command CMD to the data storage device 100. The write command CMD could include the size of data to be transmitted and information about the logical address and the logical partition (such as the logical unit number, LUN) of the data storage device 100 to be written to. When the data storage device 100 receives the write command CMD, the data storage device 100 transmits a response message RT1 to the host 200 to indicate that the host 200 could start transmitting the boot data BD1.

Afterwards, after the host 200 receives the response message RT1, it transmits the boot data BD1 to the data storage device 100. After the data storage device 100 receives the boot data BD1, the data storage device 100 transmits the response message RT2 to the host 200 to indicate that the host 200 could start transmitting the boot data BD2. Similarly, the host 200 continuously transmits the boot data BD2 and BD3 to the data storage device 100. The data storage device 100 receives the boot data BD2 and BD3, and transmits the response messages RT3 and RT4 to the host 200 respectively. When the host 200 transmits the last boot data BD4, the data storage device 100 transmits a confirm message RUPIU to the host 200 to indicate the host 200 that the boot data BD1~BD4 have been stored in the data storage device 100. The response messages RT1~RT4 could be the read to transfer UFS protocol information unit (RTT UPIU). The confirm message RUPIU could be the response UFS protocol information unit (Response UPIU). The boot data BD1~BD4 could be transmitted through the data out UPIU of UFS. In other embodiments, the host 200 could transmit the system data of other amounts and types to the data storage device 100 based on the system requirements. The data storage device could also be accessed with other memory standards by the host 200, which is not limited by the present invention.

Figure 3:
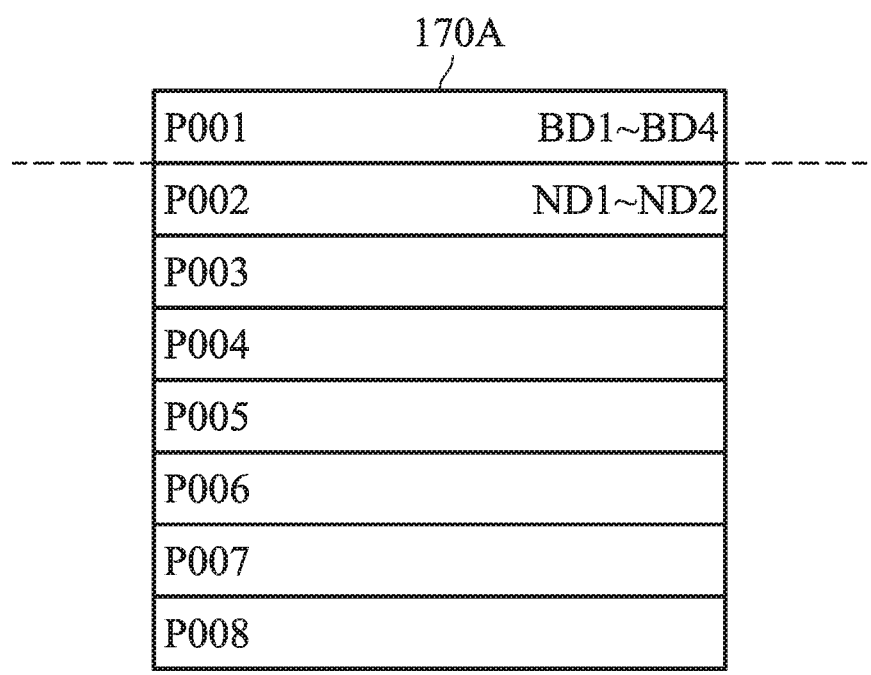
FIG. 3 is schematic diagram illustrating a table for recording the logical partition according to an embodiment of the invention.

FIG. 3 is schematic diagram illustrating a table for recording the logical partition according to an embodiment of the invention. The logical partition table 170A could store the setting information that whether the logical partition corresponds to the data partition or the system partition. The logical partition table 170A could be stored in the flash memory 140. After the data storage device 100 receives the write command CMD, the controller 120 can inquire the logical partition table 170A according to the logical partition assigned by the write command CMD to determine whether the data to be written for the write command CMD belongs to system data or normal data.

In one embodiment, the host 200 could transmit a setting command to set up each logical partition which belongs to the system partition or the data partition which is stored in the logical partition table 170A. The setting information of the logical partition could be stored by the flag of one bit by the controller 120, which is not limited thereto. For example, the flag "0" indicates that the logical partition is data partition, the flag "1" indicates that the logical partition is system partition. In the embodiment of FIG. 3, the storage space of the flash memory 140 could be divided into 8 logical partitions P001~P008. The logical partition P001 is set up to be a system partition to store the system data (such as the boot data), and the logical partitions P002~P008 are set up to be a data partition to store the normal data (such as the user data). The value of flag is not shown at the figure for simplicity. In the embodiment, the host 200 transmits boot data BD1~BD4 to the logical partition P001 and transmits normal data ND1~ND2 to the logical partition P002 respectively. In another embodiment, each logical partition of the flash memory 140 could be predetermined to be data partition. The host 200 could transmit setting command so that at least one of the logical partitions of the flash memory 140 could be set up to be a system partition.

Generally, the blocks 160~16N could be categorized as a current block, data block, or spare block, based on their usage status. When the host 200 transmits the write data to the data storage device 100, the controller 120 selects one of the spare blocks to be the current block, and writes the data to the current block. The controller 120 could store the information of the logical partition to be used by the data into the current block, such as the spare region of the current block. In addition, the controller 120 could store the mapping table F2H (the first mapping table) of the current block in the RAM 180. The mapping table F2H is utilized to record the mapping relation between the physical address and the logical address of each page of the current block. When the current block is full, the controller 120 could store the mapping table F2H to the flash memory 140 and update the mapping table H2F (the second mapping table) of the flash memory 140 based on the mapping table F2H. Meanwhile, the current block filled with data becomes the data block. The data block could become the spare block after the garbage collection operation is performed by the controller 120 for another usage.

When an abnormal power-off occurs at the data storage device 100, a sudden power-off recovery (SPOR) operation will be executed next time when the boot operation is performed by the controller 120. The SPOR operation is included at the mapping table F2H to recover the current block in the RAM 180. In one embodiment, when the host 200 transmits the system data (such as the boot data BD1~BD4) to the data storage device 100, the controller 120 transmits a confirm message RUPIU to the host 200 after the system data has been written to the current block. However, if the abnormal power-off occurs and the current block is not full, the controller 120 will transmit the boot data BD1~BD4 to the host 200 after executing the SPOR operation so that the host 200 can executes the initialization operation. Because the execution time of the SPOR operation results in the delay of the initialization time for the host 200 to perform booting, which cause bad user experience.

In another embodiment, when the host 200 transmits the system data (such as the boot data BD1~BD4) to the data storage device 100, the controller 120 transmits a confirm message RUPIU to the host 200 after the system data has been stored in the data storage device 100 completely. Specifically, when the data storage device 100 receives the boot data BD1~BD4, the controller 120 writes the boot data BD1~BD4 to the current block and updates the mapping table H2F of the flash memory 140 based on the mapping table F2H of the RAM 180. Afterwards, the controller 120 transmits a confirm message RUPIU to the host 200. Specifically, when the controller 120 determines that the logical partition of the write command CMD corresponds to the system partition (such as the logical partition P001), the controller 120 transmits a confirm message RUPIU to the host 200 after the data is written to the current block and the mapping table H2F is updated based on the mapping table F2H of the RAM 180. Because the mapping table H2F has been updated, even the abnormal power-off occurs, the controller 120 does not need to finish the SPOR operation and it can read and transmit the boot data BD1~BD4 to the host 200 when the data storage device 100 performs the SPOR operation at next booting operation. Therefore, the host 200 can receive the boot data BD1~BD4 to perform the initialization operation without waiting for the controller 120 to complete the SPOR operation.

In another embodiment, when the controller 120 determines that the logical partition of the write command CMD corresponds to the system partition, the controller 120 stores the mapping table F2H of the RAM 180 to the flash memory 140 when the data is written to the current block. Afterwards, the controller 120 transmits a confirm message RUPIU to the host 200. Because the mapping table F2H of the RAM 180 has been stored to the flash memory 140, even the abnormal power-off occurs when the controller 120 writes data to the current block, the controller 120 does not need to finish the SPOR operation and it can read the mapping table F2H to the RAM 180 and transmits the boot data BD1~BD4 to the host 200 based on the mapping table F2H when the data storage device 100 performs the SPOR operation at next booting operation. Afterwards, after the controller 120 could transmit the boot data BD1~BD4 to the host 200, it can execute the operation of re-establishing the mapping table F2H. In one embodiment, the boot data BD1~BD4 could be stored at the current block or other data blocks. Therefore, when the controller 120 reads the mapping table F2H to the RAM 180 and confirms that there is no boot data BD1~BD4 by inquiring the mapping table F2H, the controller 120 can inquire the mapping table F2H to obtain and transmit the boot data BD1~BD4 to the host 200.

In one embodiment, the process for the host 200 to write normal data ND1~ND2 is similar to the process of FIG. 2. Therefore, it will not be repeated again. When the data storage device 100 receives all normal data of a write command, the controller 120 does not store the mapping table F2H to the flash memory 140 immediately and/or update the mapping table H2F of the flash memory 140 based on the mapping table F2H. After a certain amount of data has been written to the current block or the data has been written to the last page of the current block, the controller 120 stores the mapping table F2H to the flash memory 140 immediately and updates the mapping table H2F of the flash memory 140 based on the mapping table F2H. In other words, when the controller 120 determines that the logical partition assigned by the write command CMD is a data partition which means that the data to be written by the host 200 is normal data, the controller 120 writes data to the current block and responses the confirm message RUPIU to the host 200.

In one embodiment, when the data storage device 100 receives the system data from the host 200, the controller 120 writes the system data to the current block. Afterwards, after the mapping table F2H is stored to the flash memory 140, the controller 120 transmits a confirm message RUPIU to the host 200. If the accidental event occurs such as an abnormal power-off, the SPOR operation will be executed by the data storage device 100 at next booting. The controller 120 can read the mapping table F2H which has been stored previously to save the time for re-establishing the mapping table F2H. During the process of re-establishing the mapping table F2H, the controller 120 could inspect whether the data at the current block is system data or not. When the data at previous page of the current block is system data, the controller 120 abandons the data. In another embodiment, when the data storage device 100 receives the system data from the host 200, the controller 120 writes the system data to the current block. Afterwards, the controller 120 updates the mapping table H2F, then the controller 120 transmits a confirm message RUPIUR to the host 200. If the accidental event occurs such as an abnormal power-off, the SPOR operation will be executed by the data storage device 100 at next booting. During the process of re-establishing the mapping table F2H, the controller 120 could inspect whether the data at the current block is system data or not. When the data at previous page of the current block is system data, the controller 120 determines whether or not the mapping relationship of the page in the mapping table F2H has been updated to the mapping table H2F before the abnormal power-off. If so, the controller 120 retains the system data of the page; if not, the controller 120 abandons the system data of the page.

For example, the spare region of each page of the current block is used to store the information of the logical partition corresponding to the data of the page. Accordingly, during the process of re-establishing the mapping table F2H, the controller 120 could determine the data stored by each page of the current block is system data or normal data. When the data at the current block is system data (such as the boot data), the controller 120 could abandon the data at the current block. The page of the current block which stores the data is marked to be invalid, or the mapping relation of the page in the mapping table F2H is recorded as "0xFFFFFFFF".

Specifically, when an accident occurs such as the abnormal power-off and the controller 120 executes the SPOR operation at next booting, the controller 120 could transmit the boot data to the host 200 directly according to the mapping table F2H and/or the mapping table H2F (such as the embodiments disclosed before) in order to prevent the host 200 from waiting for a long time during the initialization process. However, if another version of boot data which is stored at the current block is still valid, it may result in the conflict of the versions of the boot data. For example, the host 200 may write the boot data BD1~BD4 and BD5~BD8 to the data storage device 100 respectively, and the boot data BD1~BD4 and BD5~BD8 belong to different versions. When the boot data BD1~BD4 have been completely stored in the data storage device 100 (which means that the controller 120 has feedback the confirm message RUPIU of the write command of the boot data BD1~BD4 to the host 200) and an abnormal power-off occurs during the process where the controller 120 writes the boot data BD5~BD8 to the current block, the controller 120 transmits the boot data BD1~BD4 which have been stored to the flash memory 140 to the host 200 based on the mapping table F2H and/or the mapping table H2F of the current block to execute the initialization operation. However, when the boot data BD5~BD8 are reserved for the controller 120 to perform the SPOR operation (such as the mapping table F2H records the mapping relation between the physical address and the logical address of the boot data BD5~BD8 during the process of re-establishing the mapping table F2H), it will result in the conflict between the versions of the boot data.

In summary, during the process of re-developing the mapping table F2H for the SPOR operation, the controller 120 will abandon the system data when the data at the current block is system data and the mapping relation of system data at the mapping table F2H has not been updated to the mapping table H2F before the SPOR or the mapping table F2H is not stored to the flash memory 140. Furthermore, if the data at the current block is normal data (such as the normal data ND1~ND2), the controller 120 does not determine whether the normal data should be abandoned or not. The normal data is accessed according to the normal process of re-developing the mapping table F2H.

Figure 4A:
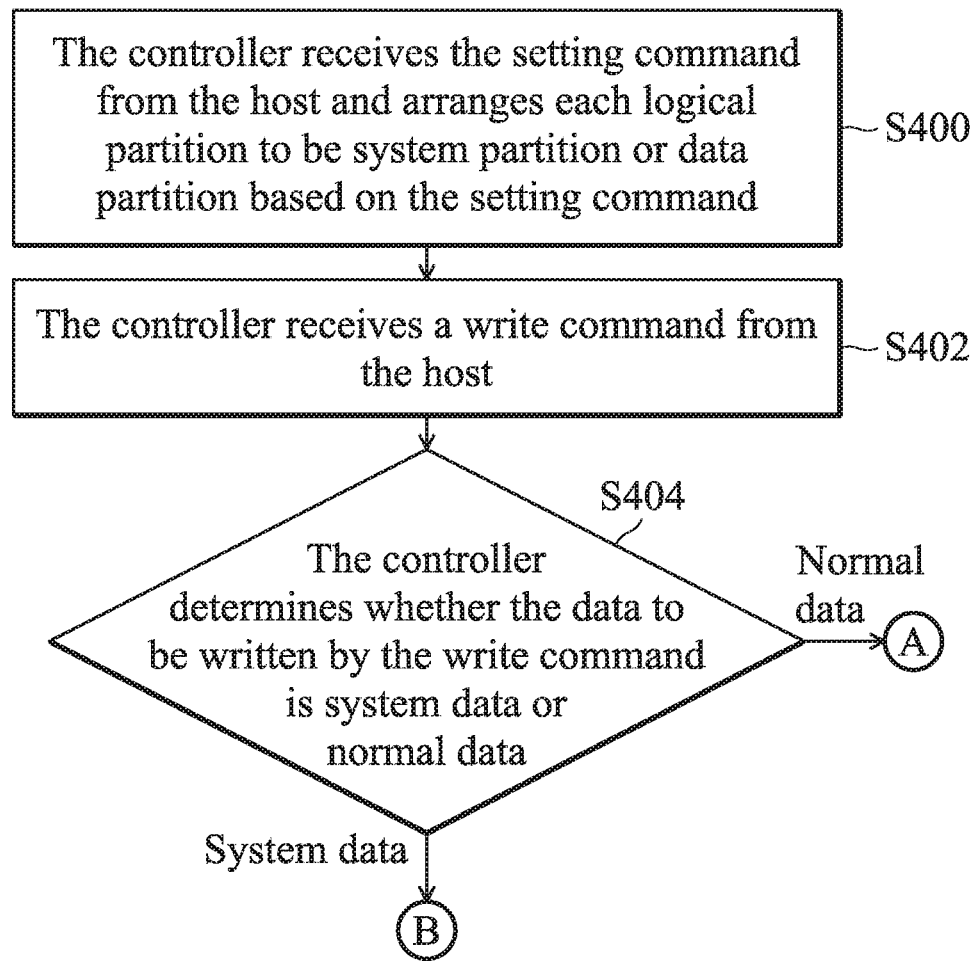
FIGS. 4A~4B are flowcharts illustrating the data storage method according to an embodiment of the invention.
Figure 4B:
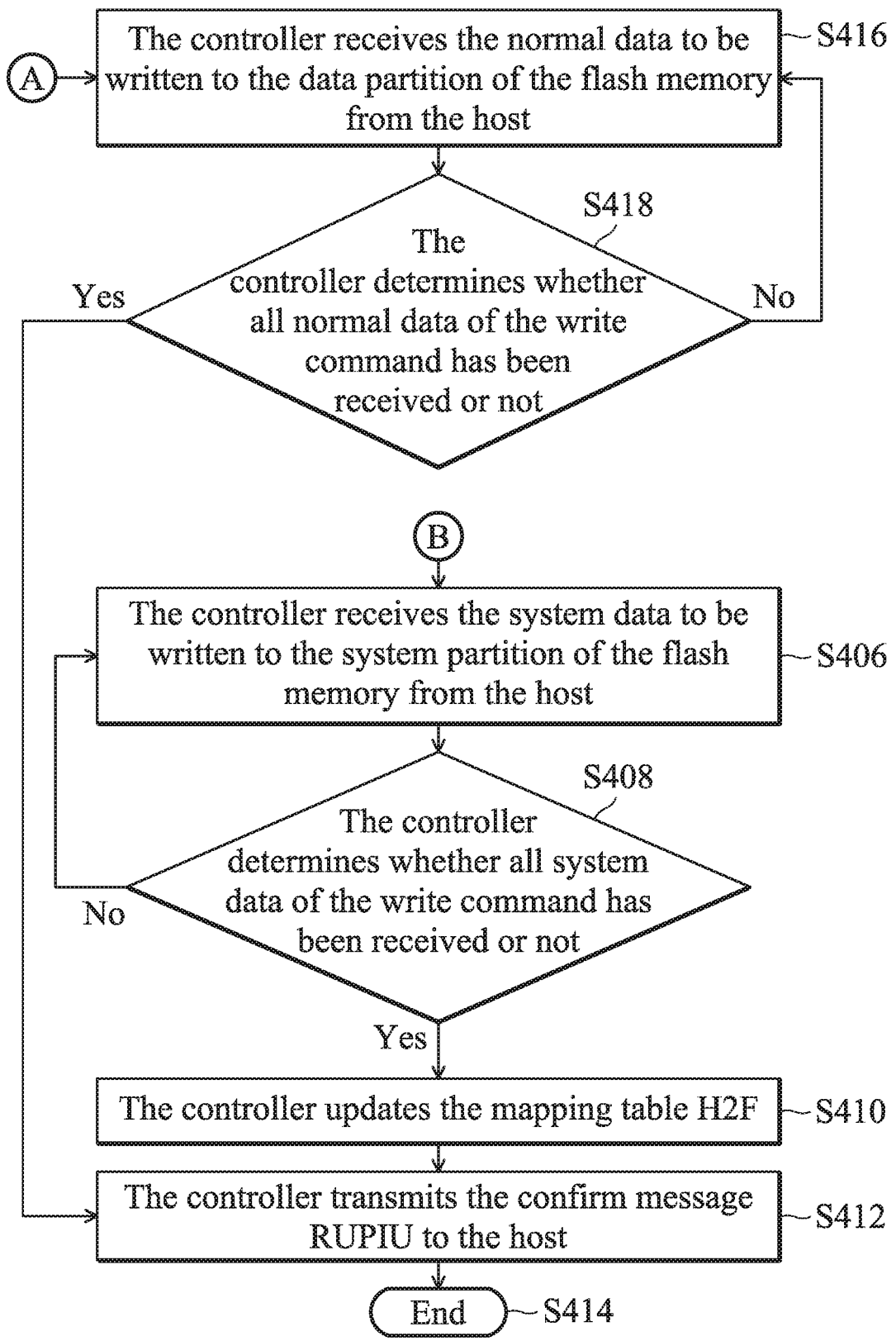

FIGS. 4A~4B are flowcharts illustrating the data storage method according to an embodiment of the invention. The data storage method is applied to the electronic device 10, especially the controller 120 of the data storage device 100. In step S400, the controller 120 receives the setting command from the host 200 and arranges each logical partition to be a system partition or a data partition, based on the setting command. Specifically, the controller 120 could store a table (such as the logical partition table 170A) to record whether the logical partition corresponds to the system partition or the data partition. The recording of table has been illustrated before, and will not be repeated again. In another embodiment, each logical partition can be predetermined to be logical partition. The step S400 could be replaced that the controller 120 receives the setting command from the host 200 and arranges at least one of the logical partitions to be the system partition.

In step S402, the controller 120 receives a write command from the host 200. The write command CMD could include the size of data to be transmitted and the information about the logical address and the logical partition of the data storage device 100 to be written to. In step S404, the controller 120 determines whether the data to be written by the write command is system data or normal data. If it is system data, step S406 will be executed. If it is normal data, step S416 will be executed. The controller 120 can determines whether the logical partition assigned by the write command is system partition or data partition by inquiring the logical partition table 170A according to the logical partition assigned by the write command. Furthermore, the controller 120 can determine whether the data to be written by the write command is system data or normal data.

In step S406, the controller 120 receives the system data to be written to the system partition of the flash memory 140 from the host 200. The controller 120 writes the received system data to the current block, and maintains the mapping table F2H of the current block in the RAM 180. Afterwards, in step S408, the controller 120 determines whether all system data of the write command has been received or not. If so, step S410 will be executed; if not, step S406 will be executed.

In step S410, the controller 120 updates the mapping table H2F. The mapping table H2F is updated by the controller 120 according to the mapping table F2H. After the controller 120 updates the mapping table H2F, the data to be written by the write command (which means the system data) has been completely stored in the data storage device 100. In step S412, the controller 120 transmits a confirm message RUPIU to the host 200. In step S414, the data storage method finishes. In another embodiment, the controller 120 stores the mapping table F2H in the RAM 180 to the flash memory 140.

In step S416, the controller 120 receives the normal data to be written to the data partition of the flash memory 140 from the host 200. The controller 120 writes the received system data to the current block, and maintains the mapping table F2H of the current block in the RAM 180. Afterwards, in step S418, the controller 120 determines whether all normal data of the write command has been received or not. If so, step S412 will be executed; if not, step S416 will be executed again. In step S412, the controller 120 transmits a confirm message RUPIU to the host 200. It should be noted that in this step, the controller 120 transmits a confirm message RUPIU to the host after the received data has been written to the current block. The confirm message RUPIU can be transmitted without waiting for the update of the mapping table H2F or the storing of the mapping table F2H of the RAM 180 to the flash memory 140. Afterwards, step S414 will be executed to finish the data storage method.

Figure 5A:
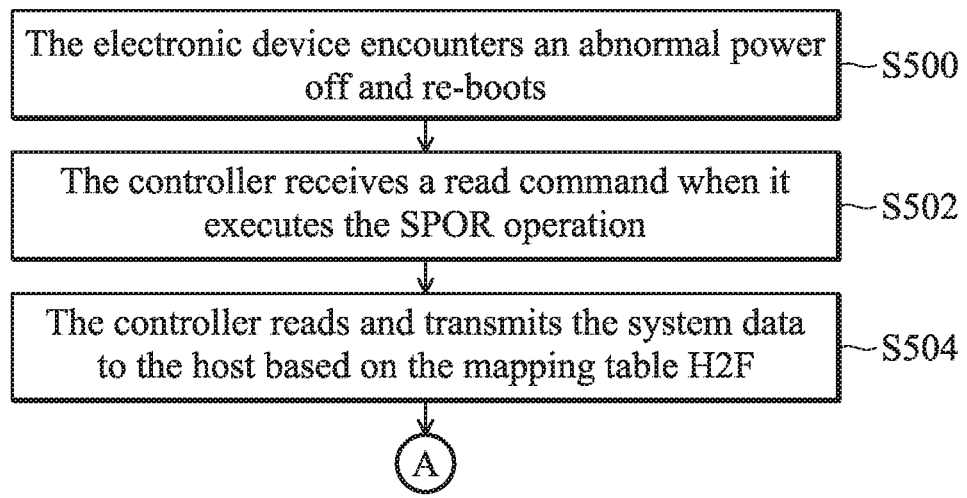
FIGS. 5A~5B show a flowchart illustrating the data storage method according to another embodiment of the invention Corresponding numerals and symbols in the different figures generally refer to corresponding parts unless otherwise indicated. The figures are drawn to clearly illustrate the relevant aspects of the embodiments and are not necessarily drawn to scale.
Figure 5B:
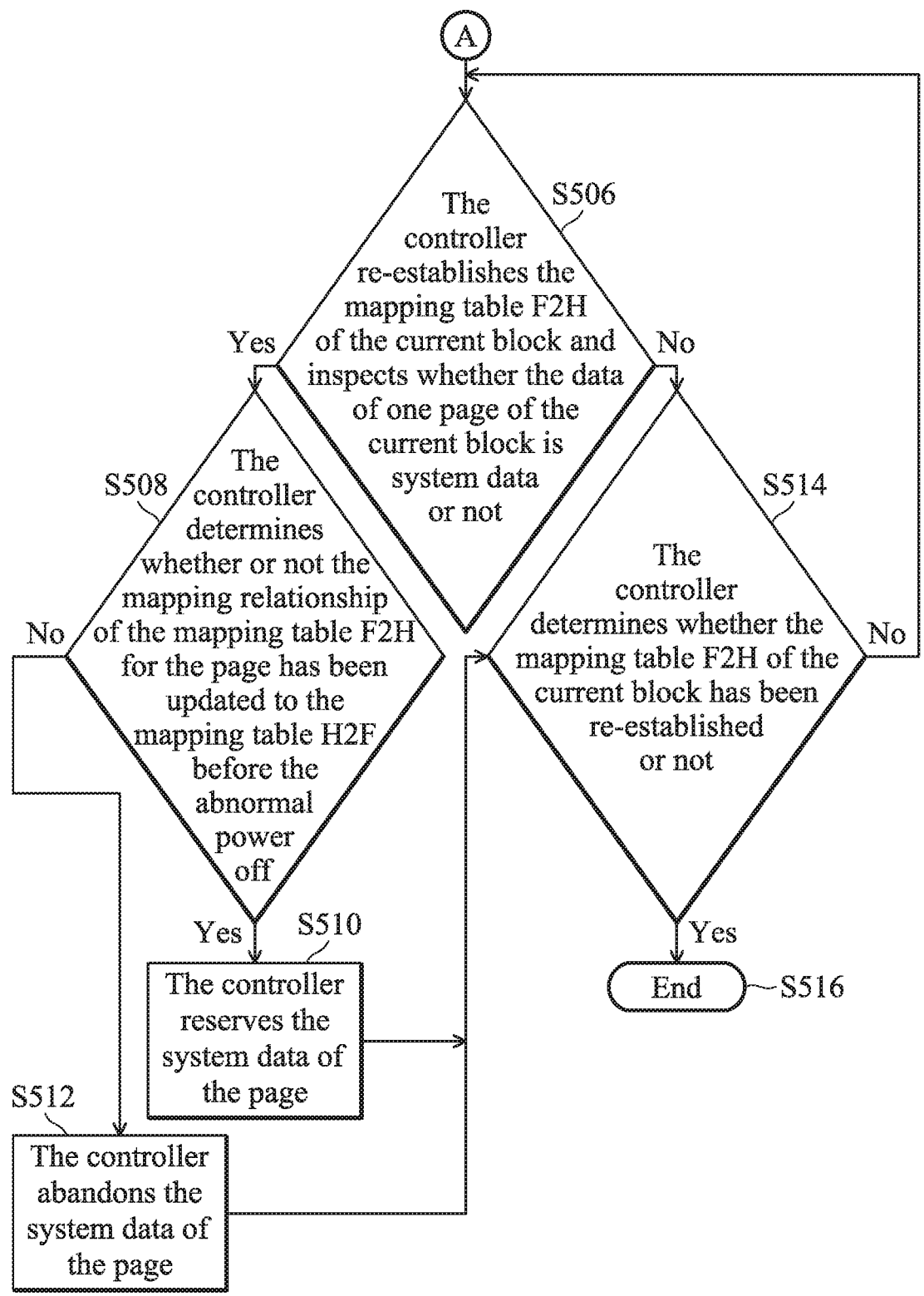

FIG. 5 is a flowchart illustrating the data read method according to another embodiment of the invention. The data read method is applied to the electronic device 10, especially the controller 120 of the data storage device 100. The data read method can be executed after the data storage method as shown before so that the data read method and the data storage method can be combined into a data access method. In step S500, the electronic device 10 encounters an abnormal power-off and re-boots. In step S502, the controller 120 receives a read command when it executes the SPOR operation. The read command is used to read the system data (such as the boot data BD1~BD4) of a system partition of the flash memory 140 so that the host 200 can execute the initialization operation.

In step S504, the controller 120 reads and transmits the system data to the host 200 based on the mapping table H2F. In the embodiment, when the controller 120 receives the system data, it updates the mapping table H2F based on the mapping table F2H. Afterwards, the controller 120 transmits a confirm message RUPIU to the host 200 so that the controller 120 can read the system data directly according to the mapping table H2F. In another embodiment, when the controller 120 receives the system data, it stores the mapping table F2H of the current block into the flash memory 140. Afterwards, the controller 120 transmits a confirm message RUPIU to the host 200. Accordingly, the step S504 can be replaced that the controller 120 reads and transmits the system data to the host 200 according to the mapping table F2H. If the system data is not at the current block, the controller 120 can read the system data based on the mapping table H2F.

In step S506, the controller 120 re-establishes the mapping table F2H of the current block and inspects whether the data of one page of the current block is system data or not. When the data of page is system data, step S508 will be executed otherwise, step S514 will be executed. For example, the controller 120 determines whether the data stored at each page is system data or normal data according to the information of the logical partition stored by the spare region of each page of the current block. Specifically, when the logical partition stored by the spare region of a page of the current block corresponds to the system partition, the controller 120 determines that the page stores the system data. When the logical partition stored by the spare region of a page of the current block corresponds to the data partition, the controller 120 determines that the page stores the normal data.

In step S508, the controller 120 determines whether or not the mapping relationship of the mapping table F2H for the page has been updated to the mapping table H2F before the abnormal power-off. If so, step S510 will be executed so that the controller 120 reserves the system data of the page, and step S514 will be executed. If not, step S512 will be executed so that the controller 120 abandons the system data of the page. Afterwards, step S514 will be executed. For example, the controller 120 inquires whether or not a physical address corresponding to the logical address of the mapping table F2H is the physical address of the page according to a logical address which is stored by the spare region of the page. If so, it means that the mapping relationship of the mapping table F2H for the page has been updated to the mapping table H2F before the abnormal power-off. The mapping relationship between the logical address and the physical address of the page could be recorded at the mapping table F2H by the controller 120 to reserve the system data of the page. In addition, the controller 120 can abandon the system data of the page by marking the page of the current block which stores the data to be invalid or canceling the mapping relationship of the mapping table F2H for the page such as recording the mapping relationship of the page in the mapping table F2H to be "0xFFFFFFFF". In another embodiment, if the controller 120 transmits a confirm message RUPIU to the host 200 after storing the mapping table F2H of the current block to the flash memory 140 when it receives the system data, the step S508 could be ignored and the step S512 could be executed directly. Furthermore, because the boot data has been transmitted to the host 200 by the controller 120 in step S504, when the controller 120 determines that there is another version of boot data at the current block when re-establishing the mapping table F2H during the SPOR operation, the controller 120 could abandon the boot data of the another version at the current block to avoid the conflict between different versions.

In step S514, the controller 120 determines whether the mapping table F2H of the current block has been re-established or not. If so, step S516 will be executed to finish the data read method. If not, step S506 will be executed again.

Generally, when the abnormal power-off occurs for the electronic device 10, it takes much time for the data storage device 100 to re-develop the mapping table F2H of the current block during next booting. The controller 120 cannot transmit the boot data to the host 200 until the mapping table F2H is developed so that the host 200 can perform the initialization operation for booting. However, by utilizing the data storage device, the electronic device and data storage method and/or data read method (the data access method), the controller 120 can determine whether the data to be written by the write command CMD is system data or normal data through the logical partition which is assigned by the write command CMD. When the host 200 writes the system data to the data storage device 100, the controller 120 transmits a confirm message RUPIU to the host 200 after storing the system data to the flash memory 140. In other words, after the controller 120 writes the received system data to the current block, the controller 120 will store the mapping table F2H of the current block to the flash memory 140 or update the mapping table H2F based on the mapping table F2H of the current block. Afterwards, the confirm message RUPIU will be transmitted to the host 200. Accordingly, if the abnormal power-off occurs at the electronic device 10, the host 200 can quickly read the required system data (such as the boot data) for initialization at a limited period of booting time. In addition, during the process of re-establishing the mapping table F2H of the SPOR operation by the controller 120, the system data at the current block could abandon whichever version is different than that of the other system data used for initialization by the host 200. Therefore, errors in which the system data is an inconsistent version due to an abnormal power-off can be avoided.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it should be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, comprising:
   a random access memory (RAM);
   a flash memory, comprising a plurality of blocks, wherein each of the blocks comprises a plurality of pages; and
   a controller, coupled to the RAM and the flash memory, wherein the controller receives a write command from a host and determines whether data to be written by the write command is a boot data or a normal data, wherein:
   when the data to be written by the write command is the boot data, the controller transmits a confirm message to the host after the boot data is completely stored in the flash memory;
   when the controller executes a sudden power-off recovery (SPOR) operation, the controller reads a first mapping table of the flash memory and reads and transmits the boot data to the host according to the first mapping table of the flash memory, or the controller reads a second mapping table of the flash memory and reads and transmits the boot data to the host according to the second mapping table of the flash memory.

2. The data storage device as claimed in claim 1, wherein:
   the flash memory comprises a plurality of logical partitions, the controller receives a setting command from the host and sets up the logical partitions to be a system partition or a data partition respectively based on the setting command.

3. The data storage device as claimed in claim 2, wherein:
   the controller determines whether the data to be written by the write command is the boot data or the normal data according to the logical partition which is assigned by the write command, the data to be written is determined to be the boot data when the logical partition assigned by the write command corresponds to the system partition, and the data to be written is determined to be the normal data when the logical partition assigned by the write command corresponds to the data partition.

4. The data storage device as claimed in claim 1, wherein:
   the controller writes the data to be written by the write command to a current block of the blocks and maintains the first mapping table in the RAM, the first mapping table is configured to record a mapping relationship between a physical address and a logical address of each page of the current block.

5. The data storage device as claimed in claim 4, wherein: when the data to be written by the write command is the boot data, the controller writes the boot data to the current block and updates the second mapping table of the flash memory according to the first mapping table in the RAM, the controller transmits the confirm message to the host after updating the second mapping table, the second mapping table is configured to record a mapping relationship between each logical address and each physical address of the flash memory.

6. The data storage device as claimed in claim 5, wherein: when the controller receives a read command during the sudden power-off recovery (SPOR) operation and the read command is configured to read the boot data, the controller reads and transmits the boot data to the host according to the second mapping table without waiting for the SPOR operation.

7. The data storage device as claimed in claim 6, wherein: when the controller re-establishes the first mapping table during the SPOR operation, the controller inspects whether or not data of a page in the current block is the boot data, when the data of the page is the boot data, the controller determines whether the mapping relationship of the first mapping table for the page has been updated to the second mapping table or not before an abnormal power-off, if so, the boot data of the page is reserved, and if not, the boot data of the page is abandoned.

8. The data storage device as claimed in claim 4, wherein: when the data to be written by the write command is the boot data, the controller writes the boot data to the current block, stores the first mapping table in the RAM to the flash memory, and transmits the confirm message to the host after storing the first mapping table.

9. The data storage device as claimed in claim 8, wherein: when the controller receives a read command from the host during the SPOR operation and the read command is configured to read the boot data, the controller reads the first mapping table from the flash memory without waiting for the SPOR operation, and the controller reads and transmits the boot data to the host based on the first mapping table.

10. The data storage device as claimed in claim 9, wherein: when the first mapping table is re-established during the SPOR operation, the controller inspects whether data of a page of the current block is the boot data or not, and when the data of the page is the boot data, the controller abandons the boot data of the page.

11. A data access method, applied to a data storage device which comprises a flash memory and a controller, the data storage method comprising:
receiving a write command from a host;
determining whether data to be written by the write command is a boot data or a normal data;
when the data to be written by the write command is the boot data, transmitting a confirm message to the host after the boot data is completely stored in the flash memory; and
when executing a sudden power-off recovery (SPOR) operation, reading a first mapping table of the flash memory and reading and transmitting the boot data to the host according to the first mapping table of the flash memory, or reading a second mapping table of the flash memory and reading and transmitting the boot data to the host according to the second mapping table of the flash memory.

12. The data access method as claimed in claim 11, wherein the flash memory comprises a plurality of logical partitions, the data access method further comprising:
receiving a setting command from the host, and setting up the logical partitions to be a system partition or a data partition respectively based on the setting command.

13. The data access method as claimed in claim 12, wherein determining whether data to be written by the write command is the boot data or the normal data further comprises:
determining whether the data to be written by the write command is the boot data or the normal data according to the logical partition which is assigned by the write command, wherein the data to be written is determined to be the boot data when the logical partition assigned by the write command corresponds to the system partition, and the data to be written is determined to be the normal data when the logical partition assigned by the write command corresponds to the data partition.

14. The data access method as claimed in claim 11, further comprising:
writing the data to be written by the write command to a current block of the blocks and maintaining the first mapping table in a RAM, wherein the first mapping table is configured to record a mapping relationship between a physical address and a logical address of each page of the current block.

15. The data access method as claimed in claim 14, further comprising:
if the data to be written by the write command is the boot data, updating the second mapping table of the flash memory according to the first mapping table in the RAM when receiving all boot data of the write command; and
transmitting the confirm message to the host after updating the second mapping table, wherein:
the second mapping table is configured to record a mapping relationship between each logical address and each physical address of the flash memory.

16. The data access method as claimed in claim 15, further comprising:
receiving a read command during the sudden power-off recovery (SPOR) operation, wherein the read command is configured to read the boot data; and
reading and transmitting the boot data to the host according to the second mapping table without waiting for the SPOR operation.

17. The data access method as claimed in claim 16, further comprising:
when the controller re-establishes the first mapping table during the SPOR operation, inspecting whether or not data of a page in the current block is the boot data; and
when the data of the page is the boot data, determining whether the mapping relationship of the first mapping table for the page has been updated to the second mapping table or not before an abnormal power-off, and if so, reserving the boot data of the page, and if not, abandoning the boot data of the page.

18. The data access method as claimed in claim 14, further comprising:
when the data to be written by the write command is the boot data, writing the boot data to the current block;
storing the first mapping table in the RAM to the flash memory; and transmitting the confirm message to the host after storing the first mapping table.

19. The data access method as claimed in claim 18, further comprising:
receiving a read command from the host during the SPOR operation, wherein the read command is configured to read the boot data;
reading the first mapping table from the flash memory without waiting for the SPOR operation; and
reading and transmitting the boot data to the host based on the first mapping table.

20. The data access method as claimed in claim 19, further comprising:
when the first mapping table is re-established during the SPOR operation, inspecting whether data of a page of the current block is the boot data or not; and
when the data of the page is the boot data, abandoning the boot data of the page.

* * * * *